Patented July 27, 1937

2,088,506

UNITED STATES PATENT OFFICE 2,088,506

PROCESS AND COMPOSITION FOR APPLYING AND FIXING DIAZOIMINO DYESTUFFS

Ivan F. Chambers, Wilmington, Del., assignor to E. I. du Pont de Nemours & Company, Wilmington, Del., a corporation of Delaware No Drawing. Application April 6, 1934, Serial No. 719,411

21 Claims. (Cl. 8—5)

This invention relates to the art of dyeing and printing, and more particularly to the art of dyeing and printing insoluble azo colors or ice colors alone or together with vat colors.

The insoluble azo colors or ice colors are not offered to the dyer and printer as dyestuffs in the usual sense but are produced locally on the fiber by the combination of their constituents. When certain aromatic amines are diazotized and coupled with suitable coupling components well known in the ice color art, insoluble dyestuff pigments are obtained which possess good fastness properties.

The precipitation of the insoluble azo pigment on and within the fiber constitutes a dyeing procedure of great importance to the textile industry.

The following is a description of the more common methods of application of insoluble azo colors by printing methods.

*(A) Printing of thickened diazo solutions on naphthol prepared fabrics*

By this process, cotton material is prepared for the subsequent printing operation by impregnating or padding with a solution of an alkaline naphtholate and carefully drying. The prepared material is then printed with a thickened diazo solution, the color being almost instantaneously formed by the reaction between the diazo solution and the naphthol. The printed material is then passed through a weakly acid bath to remove any surplus diazo compound, rinsed in cold water, soaped, rinsed and dried.

The first color of this series to come into general use was para-red. This color is produced by printing a thickened solution of diazotized para-nitraniline on cotton material padded with beta-napthol. A wide range of shades is obtained on beta-naphthol prepared goods by printing thickened diazo solutions of aromatic amines such as para-nitraniline, alpha-naphthylamine, benzidine, tolidene, dianisidine, etc.

With the advent of naphthol AS (anilide of beta-hydroxy naphthoic acid) in 1912, the use of beta-naphthol as a prepare substance was practically discontinued due to the increased fastness properties and brilliancy of the new series of colors. Naphthol AS was followed by a large number of related products which increased the number of shades obtainable with diazotized amines.

The preparation of thickened diazo solutions for printing purposes was greatly facilitated by the introduction of the stabilized diazo salts. The stabilized diazo salts are offered to the trade in powder form and consist of diazotized aromatic amines stabilized with zinc chloride, naphthalene-1:5-disulfonic acid and other stabilizing agents. A printing paste is readily prepared by dissolving the stabilized diazo salt in cold water and adding the solution to a suitable thickening agent such as a starch paste or gum tragacanth paste. The printing paste is then ready for use and may be printed on material prepared with a suitable naphthol, as described above.

Although extensively employed, the above printing process possesses certain disadvantages which are well recognized. One of the principal disadvantages is the instability of the printing paste. Diazo solutions are, in general, extremely unstable and decompose quickly at room temperature. For this reason, it is necessary to prepare only a limited quantity of printing paste at one time and to cool it to 5° C. to 10° C. In practice, the printing paste is usually cooled by the direct addition of blocks of ice. Although the decomposition is retarded by cooling, difficulties in printing are often encountered which may be attributed to the general instability of this class of compounds.

A second disadvantage is the instability of naphthol prepared material. After the cotton material has been padded with the solution of an alkaline naphthol and dried, the prepared material should be printed and finished with the least possible delay, as the alkaline naphtholate is not stable to atmospheric agencies. The addition of formaldehyde to the naphthol prepare bath increases the stability but, also, fixes the naphthol more securely on the fiber, especially if the material is aged, and this increases the difficulty in removing the unused naphthol from the fiber.

Since the color is only locally developed in the areas in which the printed diazo solution comes in contact with the alkaline naphtholate, there remains a certain amount of surplus naphthol which must be removed by the soaping operations. This is known as "clearing the ground".

Naphthol AS is quite substantive to cotton, and consequently a vigorous soaping with a strongly alkaline soap bath is required. If the material has been aged as is often the case when this type of color is employed in the same pattern with vat colors, it is often very difficult to obtain a pure white ground. Since the naphthol which does not enter into the production of the color represents a loss, it may be seen that it is relatively much more economical to print large designs than small ones, as the naphthol is more efficiently utilized.

(B) Printing of mixture of nitrosamines and alkaline naphtholates

By this process, all of the ingredients necessary for the production of the insoluble azo color are contained in the printing paste, thereby eliminating the preparation of the cloth with an alkaline naphtholate previous to printing.

To produce an insoluble azo color on the fiber by this method, a typical printing paste is prepared by mixing the sodium salt of a nitrosamine, caustic soda, a suitable naphthol, sodium chromate and a thickening agent which may consist of a starch or gum tragacanth paste.

The nitrosamine-sodium salt is obtained by adding a diazotized aromatic amine to an excess of sodium hydroxide, forming a compound of the general formula R—N=NONa, R representing the aromatic nucleus. This product may be mixed with the alkaline naphtholate, the mixture being fairly stable in the presence of free alkali. In an acid medium, however, the nitrosamine is converted to the active diazo salt which immediately couples with the naphthol to form the insoluble azo color.

After application of the nitrosamine printing paste, the goods are dried, exposed to air for several hours or aged in a vat color continuous ager, passed through a dilute acid bath, rinsed, soaped, rinsed and dried. Development of the insoluble azo color may also be obtained by passing the material through an acetic acid ager. The acetic acid ager is similar in construction and operation to the vat color continuous ager with the exception that provision is made for the introduction of acetic acid. The acetic acid volatilizes in the ager and the acetic acid vapors develop the insoluble azo color on the printed material.

The above process for producing insoluble azo colors on the fiber is employed to a large extent but possesses several disadvantages. The nitrosamine printing paste is only of limited stability and will decompose upon standing for several days. The nitrosamines differ in stability to a considerable extent but, in general, it may be said that most printing pastes of this type are unsuitable for printing after standing three or four days at room temperature.

When several thousand yards of material are printed with the nitrosamine type of colors, considerable difficulty is experienced in maintaining the ground or unprinted portion of the material free from coloration. During the passage through the acid bath and the subsequent soap baths, a portion of the color is removed from the printed areas and is redeposited on the ground or unprinted areas. Frequent renewals of acid and soap baths are necessary if passable results are to be obtained.

The number of nitrosamines available is limited as only certain diazotized aromatic amines may be converted into the nitrosamine. The most important and successful colors of this series have been developed in scarlet, red and orange shades.

Azo colors printed by the nitrosamine process are often included in the same pattern with vat colors, but the results are not entirely satisfactory. The printed material is aged in the vat color continuous ager and then passed through usual vat color oxidation bath containing sodium bichromate and acetic acid. If several hundred yards of material are processed, the azo color becomes progressively weaker and duller. This is due to the liberation of formaldehyde and reducing vapors in the ager by the vat color prints which exert an injurious effect on the nitrosamine. As the concentration of reducing vapors in the ager increases, the azo color is affected to a correspondingly greater extent.

It is an object of the present invention to provide a new and improved method of applying insoluble azo colors to textile fibers. Another object is to provide a new and improved method of coloring textile fibers with dyes produced from diazoimino compounds. A further object is the provision of a new and improved method of applying insoluble azo colors together with vat colors to textile fibers. Additional objects are the preparation of new and improved dye compositions and new and improved printing pastes. Other objects will appear hereinafter.

These objects are accomplished by treating a textile material with a dye composition containing a water-soluble diazoimino compound, an ice color coupling component and a compound which forms an acid on the application of heat in the presence of moisture, and then applying heat in the presence of moisture to the treated material.

In the present invention, all of the ingredients necessary for the formation of an insoluble azo color are contained in the dyeing or printing composition. In practice, the application of heat and moisture is very readily accomplished by subjecting the treated fabric to the action of live steam in a vat color continuous ager of the Mather Platt type, or in a Cottage steamer. Steaming the treated fabric for two to five minutes is sufficient to obtain a dyeing under normal conditions, but the process may be modified to suit individual requirements.

The insoluble azo color is completely developed and fixed on and within the fiber by the steaming process. No subsequent after-treatments of acid, either in liquid or vapor phase, are necessary. The printed material is suitable for certain textile articles immediately after the steaming operation has been completed. In general, however, it is advantageous to rinse the steamed fabric in warm water, soap, rinse and dry. The soaping operation removes gums and other extraneous matter from the fabric.

The present invention is based upon the following principles. Certain water-soluble diazoimino compounds described in the literature are characterized by their stability in neutral or slightly alkaline solutions but are subject to hydrolysis in acid solutions to form diazo salts. An alkaline solution, for example, of such a diazoimino compound and any of the well known ice color coupling components is stable at room temperatures as no evidence of azo color formation may be observed. Upon acidification of the solution, the diazoimino compound is hydrolyzed to the active diazo salt which immediately couples with the ice color coupling component to form an insoluble azo pigment.

Diazoimino compounds vary in stability to a considerable extent, but it may be said that all of the diazoimino compounds of interest to this invention (described later) are hydrolyzed to a noticeable extent at room temperatures in aqueous solutions which are acidified with a weak acid such as acetic acid. Upon heating the solution to the boil, the rate of hydrolysis is very materially increased. In common with other reactions of a hydrolytic nature, the rate of hydrolysis of a diazoimino compound is a function of the pH and temperature of the solution within certain limits.

By the present invention, it has been found that it is possible to prepare alkaline solutions of a diazoimino compound, an ice color coupling component and an acid-forming compound which are sufficiently stable at room temperatures to be of great industrial value. Upon heating the solution, a series of hydrolytic reactions is induced. The acid-forming compound is hydrolyzed to liberate a free acid which, in turn, provides an acid medium necessary for the hydrolysis of the diazoimino compound. The diazoimino compound upon hydrolysis liberates a diazo salt which immediately couples with the ice color coupling component to produce an insoluble azo pigment.

Numerous modifications of the above principles may be applied to the dyeing and printing arts. A dyeing or printing composition containing essentially a diazoimino compound, an alkali, an ice color coupling component and an acid-forming compound may be prepared which is of sufficient stability for practical requirements. Such solutions have been prepared which have shown only traces of decomposition at room temperatures at the end of two weeks. A textile fabric may be impregnated with such a composition, dried and steamed, whereupon an insoluble azo pigment is precipitated on and within the fibers. By a variation of the process, a textile fabric may be impregnated with such a composition and dried at elevated temperatures such as on hot dry cans, the insoluble azo pigment being precipitated on and within the fibers as before. By another variation, a textile fabric may be immersed in a solution such as described above, and the solution heated to an elevated temperature. Upon heating, the fabric becomes dyed with an insoluble azo color. Other modifications and variations of the process may present themselves to one skilled in the art without departing from the principles as outlined.

The ingredients of the dyeing and printing compositions are not, in themselves, new compounds. The application and association of these compounds to produce the above described results constitutes a new procedure in dyeing and printing according to present available information.

Practical dyeing and printing compositions may be prepared as indicated in the following paragraphs. A printing composition may contain, for example, the following ingredients:

(a) A water-soluble diazoimino compound
(b) A suitable ice color coupling component
(c) A wetting-out agent or solvent
(d) An alkaline reacting substance
(e) A thickening agent
(f) An acid-forming compound, hereafter referred to as "developing agent".

Examples of the above are given in the following paragraphs:

(a) *Water-soluble diazoimino compounds*

The diazoimino compounds are most conveniently employed in powder form and are soluble in water to various degrees. These compounds are characterized by their stability in neutral or slightly alkaline solutions and by their rapid hydrolysis in acid solutions at elevated temperatures.

The diazoimino compounds employed in the present compositions are typified by the following general formulae (1) and (2).

$$R-N=N-N\begin{matrix}R_1\\R_2\end{matrix}$$

in which R represents an aryl nucleus of the benzene, azobenzene, diphenyl, diphenylamine, naphthalene, carbazole or anthraquinone series containing no water-solubilizing groups such as sulfonic or carboxylic acid groups but which may contain alkyl, alkoxy, halogen, nitro or benzoylamino groups; $R_1$ and $R_2$ represent similar or dissimilar radicals such as alkyl, aralkyl, aryl or completely reduced carbocyclic radicals, either $R_1$ or $R_2$ being substituted by one or more water-solubilizing groups such as the sulfonic acid, carboxylic acid or hydroxy groups.

Water-soluble diazoimino compounds of the previously mentioned general formula are formed by coupling diazo salts of the general formula $$R-N_2X$$

in which R represents an aryl nucleus as described above, and X represents the residue of an acid (e. g.,—Cl), with a secondary amine of the general formula $$H-N\begin{matrix}R_1\\R_2\end{matrix}$$

in which $R_1$ and $R_2$ have the same significance previously mentioned.

Among the secondary amines referred to above may be mentioned, as preferred examples, sarcosine and methyl-glucamine. Other secondary amines may be, for example:

Diglycolamino acid
Dibenzylamine-disulfonic acid
4-sulfo-2-aminobenzoic acid
5-sulfo-2-aminobenzoic acid
1-aminobenzene-2:5-disulfonic acid
1-methyl-2-ethyl-aminobenzene-4-sulfonic acid
4-amino-1-methylbenzene-2-sulfanilide
1-aminonaphthalene-2:4-disulfonic acid
1-aminobenzene-2:3-dicarboxylic acid
Methylamino-ethane-sulfonic acid
1-methylaminobenzene-4-sulfonic acid
Butylamino-acetic acid
Cyclohexylamino-acetic acid
2-ethylamino-1-methylbenzene-4-sulfonic acid
1-aminobenzene-3:5-dicarboxylic acid
3-aminobenzene-1:2-dicarboxylic acid
2-methylamino-4-sulfobenzoic acid
Ethyl-glucamine
Cyclohexyl-glucamine
Benzyl-xylamine
Methyl-erytthramine
Ethyl-galactamine
Amyl-arabinamine
Methyl-mannamine.

The diazo salts of the general formula $R-N_2X$, mentioned above, may be prepared by diazotizing any of the aromatic amines commonly used in the ice color art, among which may be mentioned the following:

3-nitro-4-aminotoluene
    2:5-dichloroaniline
    4-chloro-2-aminotoluene
    4-chloro-2-amino-anisole
    Ortho-chloro-aniline
    Meta-chloro-aniline
    Para-nitraniline
    1-amino-4-benzoylamino-2:5-diethoxybenzene
    4-chloro-2-nitro-aniline
    N-(para-aminobenzoyl)-aniline
    Ortho-phenetidine-azo-alpha-naphthylamine
    Para-anisidine-azo-2:5-dimethoxy-aniline
    Alpha-amino-anthraquinone
    3-amino-carbazole
    Dianisidine
    Para-amino-diphenyl
    4:4'-diamino-diphenylamine
    1-amino-2-methoxy-naphthalene.

While any of the aromatic amines shown containing no water-solubilizing groups may be used, better results are usually obtained by selecting amines from the benzene, diphenyl, diphenylamine, naphthalene, azo-benzene, anthraquinone or carbazole series. These amines may have substituted thereon one or more non-water solubilizing groups such as, for example, halogen, alkyl, alkoxy, nitro and benzoylamino.

(2)  R—N=N—R₃ in which R represents an aryl nucleus as described in (1), and R₃ represents a piperidine or pyrrolidine nucleus containing at least one solubilizing group.

Among the compounds containing a piperidine nucleus may be mentioned the following:

Pipecolinic acid
    Nipecotinic acid
    Piperidine-gamma-sulfonic acid
    Piperidine-polycarboxylic acids
    Piperidine-polysulfonic acids
    Ring alkylated piperidine-carboxylic and sulfonic acids Examples of compounds containing a pyrrolidine nucleus are given below:

Pyrrolidine-alpha-carboxylic acid (proline)
    Pyrrolidine-alpha-sulfonic acid
    Beta'-hydroxy-pyrrolidine-alpha-carboxylic acid (oxy-proline)
    Pyrrolidine-beta-carboxylic acid
    Pyrrolidine-dicarboxylic acids and polycarboxylic acids
    Ring alkylated pyrrolidine-carboxylic acids and sulfonic acids such as
    4:5-dimethyl-pyrrolidine-2-carboxylic acid
    Pyrrolidine-di- and polysulfonic acids
    Poly-hydroxy-pyrrolidine-carboxylic and sulfonic acids Water-soluble diazoimino compounds of the previously mentioned general formula are obtained by coupling diazo salts of the general formula

 R—N₂X in which R represents an aryl nucleus as described previously, and X represents the residue of an acid (e. g.,—Cl), with a piperidine or pyrrolidine derivative containing at least one solubilizing group, examples of which have been given.

Examples of aromatic amines suitable for the preparation of diazo salts of the general formula 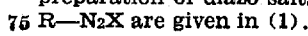 R—N₂X are given in (1).

(b) *Ice color coupling components*

Any of the well known ice color coupling components may be utilized in the printing composition. Among these may be mentioned:

(1) The various arylamides of 2:3-hydroxynaphthoic acid such as the anilide, toluidide, halogenated anilides and toluidides, alkoxy- and halogenated alkoxy-anilides (2) Acetoacetyl derivatives of arylamines such as di-acetoacet-ortho-tolidide (3) Alpha- and beta-naphthol (4) Arylamides of hydroxy-carbazole- and hydroxy-naphthocarbazole-carboxylic acids (5) Phenyl-methyl-pyrazolone and similar products (6) Arylamides of hydroxy-anthracene and hydroxy-phenanthrene-carboxylic acid (c) *Wetting-out agents or solvents*

The addition of wetting-out agents or solvents to the printing composition is optional. Improved results are often obtained, however, by the addition of from 2% to 5% of solvents or wetting-out agents such as Turkey red oil, Monopole oil, carbitol, ethylene-glycol-monoethyl-ether or ethyl alcohol.

(d) *Alkaline reacting substances*

Sodium or potassium hydroxide is preferably employed in the printing compositions in concentrations varying from 0.25% to 1.5%. The presence of an alkali metal hydroxide in the printing composition serves several purposes, as follows:

(1) The ice color coupling components are usually insoluble in acid or neutral solutions and soluble in strongly alkaline solutions. The presence of an alkali metal hydroxide, therefore, serves to solubilize the ice color coupling component.

(2) The diazoimino compounds employed are normally stable in alkaline solutions but are rapidly hydrolyzed in acid solutions. The presence of an alkali metal hydroxide stabilizes the diazoimino compound.

(3) The rate of hydrolysis at elevated temperatures of the compounds employed as developing agents is normally very rapid in the presence of strong bases and comparatively slow in the presence of weak bases. Weak bases as, for example, triethanolamine, may be employed in the present process to replace the alkali metal hydroxide, but inferior results are obtained as the reactions necessary for the formation of the azo color are too slow for practical purposes. Strong organic bases such as the tetra-alkyl-ammonium hydroxides are more suitable than weak bases such as triethanolamine.

(e) *Thickening agents*

The thickening agent preferably consists of a starch paste or a gum tragacanth paste or a suitable mixture of these pastes. Dextrin or British gum pastes may be employed but are less suitable for the azo color pastes, due to their reducing effect.

(f) *Developing agents or acid-forming compounds*

By "developing agents" is meant certain acid-forming compounds which are capable of undergoing hydrolysis to liberate free acids. It is evident that a very large number of products may be included in this class of compounds, but from a practical point of view the range of suitable compounds is limited. In order to obtain the most satisfactory results, the compound should be water-soluble and should hydrolyze slowly at room temperatures in a weakly alkaline medium such as is present in the printing compositions. This is necessary in order that the printing composition may be sufficiently stable at room temperatures for practical use. At elevated temperatures, however, such as represented by the hydrolytic influences to which the compound is subjected by steaming a fabric impregnated with the printing composition, the hydrolysis should be rapid in order that complete development of the color may be obtained in a few minutes.

Sodium monochloroacetate is a preferred example of a compound which is particularly suitable as a developing agent in the printing compositions. Printing compositions containing this compound have been prepared which do not show greater decomposition after standing for one week than similarly prepared compositions not containing sodium monochloroacetate. Upon impregnating a fabric with a printing composition containing sodium monochloroacetate and steaming for five minutes, a dyeing of excellent fastness and brilliancy is obtained, whereas no dyeing is produced if the sodium monochloroacetate is omitted from the printing composition.

The following is a classification of compounds which are suitable as developing agents for the present process of applying azo colors:

(1) Alkali metal salts of halogen substituted organic acids
(2) Esters of mono- and polyhydric alcohols
(3) Acid amides
(4) Salts of weak bases
(5) Sulfo-phenyl-alkyl-chlorides The following compounds included in the above classification are mentioned as examples:

(1) Alkali metal salts of halogen substituted organic acids

Preferred examples are:
Sodium monochloroacetate
Potassium monochloroacetate

Other examples are:
Sodium dichloroacetate
Potassium alpha-beta-dibromopropionate
Potassium beta-chlorolactate
Sodium chloro-ethyl-succinate
Sodium monochloro-succinate
Sodium dichloro-succinate
Potassium beta-dichlorolactate

(2) Esters of mono- and polyhydric alcohols

Preferred examples are:
Monacetin (glycerol monoacetate)
diacetin (glycerol diacetate)
Triacetin (glycerol triacetate)
Ethyl-lactate
Ethyl-chloroacetate
Ethyl-chlorhydrin
Alpha-chlorhydrin (alpha-propylene-chlorhydrin)

Other examples are:
Ethylene-bromhydrin
Alpha-bromhydrin
Glycol monoacetate

(3) Acid amides

Formamide
Acetamide

(4) Salts of weak bases

Salts of triethanolamine such as the following are mentioned as preferred examples:

Triethanolamine acetate
Triethanolamine formate
Triethanolamine oxalate
Triethanolamine citrate
Triethanolamine lactate
Triethanolamine nitrate
Triethanolamine sulfate
Triethanolamine hydrochloride

(5) Sulfo-phenyl-alkyl-chlorides

Benzyl-chloride-para-sulfonic acid-sodium salt

Printing compositions containing salts of triethanolamine are less stable than those containing sodium monochloroacetate. A printing composition containing triethanolamine hydrochloride, for example, decomposes more quickly at room temperatures than one containing sodium monochloroacetate. Development of the color in the ager is obtained in a noticeably shorter time, however, by the use of a triethanolamine salt than with sodium monochloroacetate.

The stability of a printing composition containing a triethanolamine salt may be increased to a certain extent by the addition of free triethanolamine. The presence of an excess of triethanolamine represses the hydrolysis of the salt.

Salts of other organic bases may also be employed as developing agents. Organic bases which are water-soluble and are not volatile at room temperatures are preferred. Very weak organic bases as, for example, pyridine are less suitable as considerable decomposition of the printing composition takes place at room temperatures, even in the presence of a large excess of free base. Salts of very strong organic bases such as guanidine and the tetra-alkyl-ammonium hydroxides are not usually of interest, as these salts are too stable to hydrolytic influences.

Aromatic amino compounds of basic character which readily form salts but are capable of coupling with diazo salts are not normally employed. However, such compounds containing substituted groups which prevent or hinder coupling with diazo salts may be used.

Experiments in the development of the present invention have shown that organic compounds lying within the range of basicity illustrated by the following organic bases may be employed:

| Base | pKab (25° C.) | Association exponent |
|---|---|---|
| Pyridine | 5.26 | Weak organic base |
| Triethanolamine | 7.77 | |
| Trimethylamine | 9.76 | |
| Di-n-butylamine | 11.31 | Fairly strong organic base |

Acids varying in strength from weak organic acids to strong mineral acids may be employed to form salts with the bases previously described.

| Examples | K (dissociation constant) | |
|---|---|---|
| Acetic acid | $1.8 \times 10^{-5}$ | Weak acid |
| Dichloroacetic acid | about $5 \times 10^{-2}$ | Moderately strong acid |
| Hydrochloric acid | about $10^{+7}$ | Strong acid |

Two lists are given below, (a) containing bases suitable for salt formation and (b) containing acids suitable for salt formation. Organic salts formed from the neutralization of any of the bases mentioned in (a) with any of the acids mentioned in (b) may be employed as developing agents.

(a) Bases

The bases mentioned vary in basicity from weak bases (pyridine) to fairly stronge bases (di-n-butylamine).

| Base | pKab (25° C.) |
| --- | --- |
| Pyridine | 5.28 |
| n-Methyl-p-toluidine | 5.33 |
| n-Ethyl-p-toluidine | 5.67 |
| Triethanolamine | 7.77 |
| Diethanolamine | 8.88 |
| 2-hydroxy-3-ethyl-piperidine | 9.09 |
| Ammonia | 9.37 |
| Monoethanolamine | 9.44 |
| Trimethylamine | 9.76 |
| 1-ethyl-piperidine | 10.41 |
| 1-n-butyl-piperidine | 10.48 |
| Methylamine | 10.59 |
| n-Butylamine | 10.61 |
| Ethylamine | 10.64 |
| Cyclohexylamine | 10.64 |
| n-Amylamine | 10.64 |
| 1-n-butyl-2-methyl-piperidine | 10.72 |
| Dimethylamine | 10.76 |
| Di-isobutylamine | 10.82 |
| 2-methyl-piperidine | 10.98 |
| Diethylamine | 10.98 |
| Di-isopropylamine | 11.05 |
| Piperidine | 11.13 |
| Di-n-butylamine | 11.31 |

(b) Acids

The acids mentioned vary in acidity from weak acids (acetic acid) to strong acids (hydrochloric acid).

Acetic acid
Citric acid
Tartaric acid
Oxalic acid
Lactic acid
Formic acid
Monochloroacetic acid
Dichloroacetic acid
Nitric acid
Sulfuric acid
Hydrochloric acid The invention will be further illustrated, but is not limited by the following examples, in which the quantities are stated in parts by weight.

*Example I*

7 parts of a mixture in powder form consisting of 4.185 parts of the dry diazoimino compound prepared by the action of methyl-glucamine on diazotized para-chloro-ortho-toluidine of the following probable structure:

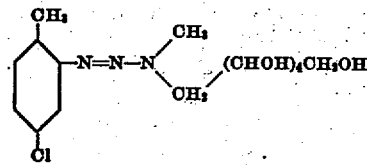

and 2.815 parts of the ortho-toluidide of 2:3-hydroxy-naphthoic acid.

To this mixture were added:

7 parts of ethylene-glycol-monoethyl-ether followed by
12 parts water
3 parts 30% solution of sodium hydroxide.
  The above mixture was heated to 140° F. to obtain a solution, cooled and added to
51 parts ST thickener
  When well stirred in, there were added
20 parts sodium monochloroacetate
___
100 parts The whole was then stirred until a smooth paste was obtained.

*ST thickener*

100 parts wheat starch
540 parts water
360 parts gum tragacanth (6% solution)
___
1000 parts Heated at the boil for twenty minutes and cooled to room temperature.

Cotton piece goods were printed from an engraved copper roll with the above printing composition, dried in the air, and then subjected to the action of live steam at 218° F. for five minutes by a passage through a vat color ager of the Mather Platt type. The fabric, as it emerged from the ager, was observed to be dyed according to the printed pattern with a bright red dyestuff of the following probable formula:

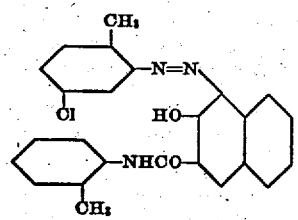

The printed fabric was then rinsed, soaped in a hot soap solution, again rinsed, and dried.

The dyeing possessed very good fastness properties.

*Example II*

7 parts of a dry commercial powder consisting essentially of a mixture of a water-soluble diazoimino derivative of diazotized parachloro-ortho-toluidine and the ortho-toluidide of 2:3-hydroxy-naphthoic acid in approximately equimolecular proportions were added to
7 parts of ethylene-gylcol-monoethyl-ether
12.5 parts of water and
3 parts of a 30% solution of sodium hydroxide.

The above was heated to 140° F. to obtain a solution, cooled and added to 60 parts of ST thickener.

To this were added
6.8 parts of sodium monochloroacetate
3.7 parts of water
___
100.0 parts The whole was well stirred in until a smooth paste was obtained. Cotton piece goods were printed with this paste, dried, aged for ten minutes at 216° F., rinsed, soaped, rinsed again and dried. The fabric was dyed according to the printing pattern with a bright red dyestuff of the same probable formula as in Example I.

The diazoimino component referred to above is:

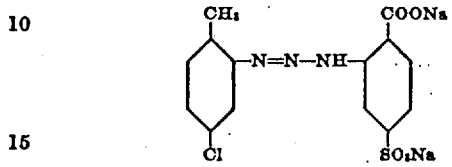

Example III

The following printing composition was prepared by the same procedure as employed in Example I:

5 parts of a mixture of diazoimino compound and the ortho-toluidide of 2:3-hydroxy-naphthoic acid as employed in Example I.
    5 parts of ethylene-glycol-monoethyl-ether
    12 parts of water
    3 parts of a 35% solution of sodium hydroxide
    60 parts of ST thickener
    15 parts of sodium monochloroacetate
    ———
    100 parts Piece goods containing the following fibers were printed with the above printing composition:
(a) Cotton
(b) Artificial cellulose fabric (viscose)
(c) Cellulose acetate
(d) Wool
(e) Silk
(f) Tin-weighted silk (45%)

The material was then dried in the air, aged for ten minutes at 216° F., rinsed, soaped, rinsed again and dried.

Each type of fiber was dyed according to the printed pattern with a bright red dyestuff as in Example I.

Example IV

The following printing composition was prepared by the same procedure as employed in Example I:

7 parts of a mixture of diazoimino compound and the ortho-toluidide of 2:3-hydroxy-naphthoic acid as employed in Example I.
    7.5 parts of ethylene-glycol-monoethyl-ether
    2.5 parts of a 30% solution of sodium hydroxide.
    10.5 parts of water
    50 parts of ST thickener
    2.5 parts of pine oil
    20 parts of alpha-monochlorhydrin
    ———
    100.0 parts Cotton piece goods were printed with the above printing composition, dried, aged for five minutes at 218° F., rinsed, soaped, rinsed again and dried. The material was dyed according to the printed pattern with a red dyestuff as in Example I.

Example V

The following printing composition was prepared by the same procedure as employed in Example I:

6 parts of a mixture of diazoimino compound and the ortho-toluidide of 2:3-hydroxy-naphthoic acid as employed in Example I.
    6 parts of ethylene-glycol-monoethyl-ether
    12 parts of water
    3 parts of a 30% solution of sodium hydroxide
    58 parts of ST thickener
    15 parts of ammonium oxalate
    ———
    100 parts Cotton piece goods were impregnated with the above printing composition, dried, aged for five minutes, rinsed and dried. The material was dyed with a red dyestuff as in Example I.

Example VI

The same procedure was employed as in Example V with the exception that in the printing composition 15 parts of ammonium oxalate were replaced by 15 parts of triethanolamine lactate. A red dyeing was obtained as in Example I.

Example VII 6 parts of a dry commercial powder consisting essentially of a mixture of a water-soluble diazoimino derivative of diazotized para-chloro-ortho-toluidine and the ortho-toluidide of 2:3-hydroxy-naphthoic acid in approximately equimolecular proportions dissolved in
    21 parts of water and
    3 parts of a 35% solution of sodium hydroxide.

To the above solution was added the following mixture:

50 parts of ST thickener
    4.75 parts of hydrochloric acid (specific gravity 1.18)
    10.5 parts of triethanolamine
    4.75 parts of water
    ———
    100.00 parts Cotton piece goods were printed, dried, aged for two minutes at 230° F. (110° C.), rinsed in cold water, soaped, rinsed and dried. The material was dyed with a red dyestuff as in Example I.

Example VIII 6 parts of a dry powder consisting of a mixture of a water-soluble diazoimino compound and the ice color coupling component as in Example V.
    6 parts of ethylene-glycol-monoethyl-ether
    12 parts of sodium hydroxide
    3 parts of a 30% solution of sodium hydroxide
    58 parts of ST thickener The above was well stirred to produce a smooth paste and
    15 parts of acetamide were added.
    ———
    100 parts.

Cotton piece goods were impregnated with the above printing composition, dried, aged for five minutes at 216° F., rinsed, soaped, rinsed and dried.

The material was dyed with a red dyestuff as in Example I.

Example IX 10.5 parts of a mixture in powder form consisting of 5.93 parts of the dry diazo-imino compound prepared by the action of methyl-glucamine on diazotized meta-chloro-aniline of the following probable structure:

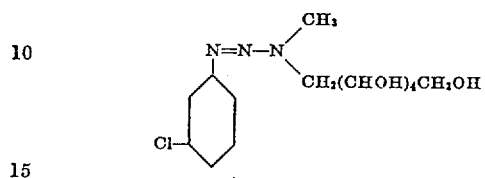

and 4.57 parts of the ortho-toluidide of 2:3-hydroxy-naphthoic acid.

To this mixture was added

- 6 parts of ethylene-glycol-monoethyl-ether followed by
- 16 parts of water
- 2.5 parts of a 30% solution of sodium hydroxide.

The above mixture was heated to 150° F. to obtain a solution, cooled, and added to

- 55 parts of ST thickener
  When well stirred in, there was added
- 10 parts of sodium monochloroacetate 100 parts The whole was then stirred until a smooth paste was obtained.

Cotton piece goods were printed from an engraved copper roll, dried in the air and aged for ten minutes at 218° F. The fabric was dyed according to the printed pattern with a bright orange dyestuff of the following probable formula:

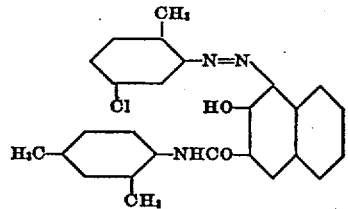

The printed fabric was then rinsed, soaped in a hot soap solution, again rinsed, and dried. The dyeing possessed very good fastness properties.

Example X 4 parts of a mixture in powder form consisting of 2.4 parts of the dry diazo-imino compound prepared from diazotized para-chloro-ortho-toluidine and the sodium salt of pipecolinic acid (piperidine-alpha-carboxylic acid) of the following probable structure:

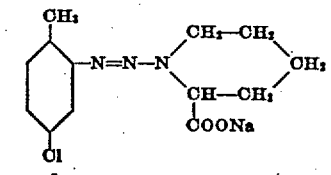

and 1.6 parts of the asymmetrical-meta-xylidide of beta-hydroxy-naphthoic acid.

To this mixture was added

- 14 parts of water and
- 2 parts of a 35% solution of sodium hydroxide.

The above mixture was heated to 130° F. to obtain a solution, cooled to 100° F. and added to

- 40 parts of ST thickener
  When well stirred in, there were added
- 15 parts of sodium monochloroacetate dissolved in
- 15 parts of ST thickener 100 parts The whole was then stirred until a smooth paste was obtained.

Cotton piece goods were printed with the above printing composition, dried in the air, aged for five minutes at 218° F. in an ager of the Mather Platt type, rinsed in cold water, soaped, again rinsed, and dried.

The cotton material was dyed with a bright red dyestuff of the following probable formula:

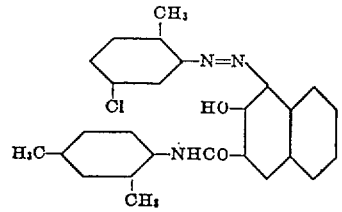

The dyeing possessed very good fastness properties.

Example XI

- 4 parts of the mixture of diazoimino compound and ice color coupling component as employed in Example X
- 14 parts of water
- 2 parts of a 35% solution of sodium hydroxide The above mixture was heated to 130° F. to obtain a solution, cooled to 100° F. and added to

- 40 parts of ST thickener
  When well stirred in, there were added
- 10 parts of triethanolamine hydrochloride dissolved in
- 30 parts of ST thickener 100 parts Cotton piece goods were printed with the above printing composition, dried, aged for five minutes at 218° F., rinsed in cold water, soaped, again rinsed, and dried.

The cotton material was dyed with a bright red dyestuff of the same probable formula as described in Example X.

Example XII

- 4 parts of the mixture of diazoimino compound and ice color coupling component as employed in Example X
- 14 parts of water
- 1.5 parts of a 35% solution of sodium hydroxide.

The above mixture was heated to 140° F. to obtain a solution, cooled to 90° F., and added to

- 55 parts of ST thickener.
  When well stirred in, there were added
- 15 parts of benzyl-chloride-para-sulfonic acid-sodium salt dissolved in
- 10.5 parts of water 100.0 parts Cotton piece goods were printed with the above printing composition, dried, aged for six minutes at 214° F., rinsed in cold water, soaped, again rinsed, and dried.

The cotton material was dyed with a bright red dyestuff of the same probable formula as described in Example X.

The following examples illustrate printing the azo colors in the same pattern with vat colors:

*Example XIII*

The following printing composition was prepared for the application of the azo color:

4 parts of a mixture in powder form consisting of 2.4 parts of the dry diazoimino compound prepared from diazotized para-chloro-ortho-toluidine and the sodium salt of pipecolinic acid (piperidine-alpha-carboxylic acid) of the following probable structure:

[structure]

and 1.6 parts of the asymmetrical-meta-xylidide of beta-hydroxy-naphthoic acid. To this mixture were added
14 parts of water and
2 parts of a 35% solution of sodium hydroxide.

The above mixture was heated to 140° F. to obtain a solution, cooled to 90° F., and added to
35 parts of ST thickener
When well stirred in, there were added
16 parts of sodium monochloroacetate dissolved in
29 parts of ST thickener 100 parts The whole was then stirred until a smooth paste was obtained.

The following printing composition was prepared for the application of the vat color:
15 parts of Ponsol Blue GD Double Paste (C. I. #1113) were mixed with
85 parts of Thickener A.

100 parts

The whole was then stirred until a smooth paste was obtained.

Thickener A was prepared as follows:
6 parts of wheat starch were mixed with
18 parts of British gum and
36 parts of water.

This mixture was boiled for fifteen minutes until a paste was obtained, cooled to 170° F., and
17 parts of potassium carbonate added.

After the potassium carbonate had dissolved the paste was cooled to 140 F. and the following ingredients stirred in:
12 parts of sodium sulfoxylate formaldehyde
8 parts of glycerin and
3 parts of water.

100 parts

Upon cooling to room temperature, a smooth paste was obtained.

The azo color and the vat color were printed in the same pattern on cotton piece goods with a two-roll printing machine. The azo color printing composition was applied with the first roll and the vat color printing composition with the second roll. After printing, the fabric was dried in the air, and aged for five minutes at 216° F. in a vat color ager of the Mather Platt type. The printed material was then immersed for one minute in a vat color oxidizing bath at 150° F. containing 0.5% sodium bichromate and 0.5% acetic acid, rinsed in cold water, soaped for three minutes in a bath at 200° F. containing 0.5% soap, again rinsed, and dried.

The fabric was dyed with a blue vat dyestuff and a red azo dyestuff according to the patterns of the printing rolls. The following formula represents the probable constitution of the azo color:

[structure]

*Example XIV*

The following printing composition was prepared for the application of the azo color:

5 parts of a mixture in powder form consisting of 3 parts of the dry diazoimino compound prepared by the action of methyl-glucamine on diazotized para-chloro-ortho-toluidine of the following probable structure:

[structure]

and 2 parts of the ortho-toluidide of 2:3-hydroxy-naphthoic acid.

To this mixture was added 13.75 parts of water and
2.25 parts of a 35% solution of sodium hydroxide The above mixture was heated to 140° F. to obtain a solution, cooled to 90° F., and added to
35 parts of ST thickener.
When well stirred in, there were added
15 parts of sodium monochloroacetate dissolved in
29 parts of ST thickener.

100 parts

The whole was then stirred to obtain a smooth paste.

The following printing composition was prepared for the application of the vat color:

15 parts of Sulfanthrene Blue 2BD Double Paste (C. I. #1184) were mixed with
85 parts of thickener B 100 parts The whole was then stirred until a smooth paste was obtained.

*Thickener B:*

4 parts of wheat starch were mixed with
   20 parts of British gum and
   32 parts of water. This mixture was boiled for fifteen minutes until a paste was obtained, cooled to 140° F., and
   8 parts of glycerin added.

When well stirred in, there were added
   24 parts of a 35% solution of caustic soda. The paste was then cooled to room temperature and
   12 parts of glucose added ___
   100 parts The whole was then stirred to produce a smooth paste.

The azo color and the vat color were printed in the same pattern on cotton piece goods with a two-roll printing machine. The azo color was printed with the first roll and the vat color with the second roll. After printing, the fabric was dried in the air, and aged for five minutes at 218° F. in a vat color ager of the Mather Platt type. The printed material was then immersed for one minute in a bath at 150° F. containing 0.5% sodium bichromate and 0.5% acetic acid, rinsed in cold water, soaped for three minutes in a bath at 200° F. containing 0.5% soap, again rinsed, and dried.

The fabric was dyed with a blue vat dyestuff and a red azo dyestuff according to the pattern of the printing rolls. The following formula represents the probable constitution of the azo color:

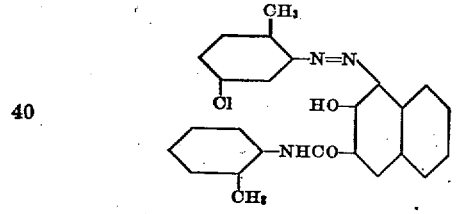

It will be apparent that other vat colors suitable for printing may be employed in a similar manner.

The present process for the application of insoluble azo colors possesses the following advantages over processes in general use.

(A) *Advantages over the process of printing thickened diazo solutions on fabrics impregnated with an ice color coupling component (naphthol prepared fabrics, etc.)*

By the new process the components of the color are applied in one operation and it is, therefore, more economical to employ than the usual two-step process requiring preparation of the fabric with an ice color coupling component. The new process also assures more efficient utilization of the ice color coupling component which is incorporated in the printing composition. By the two-step process, the excess of ice color coupling component which does not enter into reaction with the diazo component is removed by soaping. Certain naphthols are quite substantive to cotton and a vigorous soaping with a strongly alkaline soap bath is necessary to completely remove them from the fiber or to "clear the ground". These soaping operations are, in many cases, sufficiently drastic to be injurious to the printed portions of the fabric. By the present process, only a slight soaping is needed to remove the printing gum, inorganic salts, etc.

The new process is applicable to animal and synthetic fibers, whereas the usual two-step process is not generally employed due to the injurious effect of the alkaline prepare.

By the two-step dyeing process only one ice color coupling component or a selected mixture can be employed for a pattern requiring several colors. In such a pattern, the most desirable combination of ice color coupling component and diazo component cannot always be used. Since, in the present process, the ice color coupling component is incorporated in the printing composition, the most suitable combination of ice color coupling component and diazo component may be employed for each color, irrespective of other colors in the same pattern. For the same reasons, the depth of shade of each color is more easily controlled in the present process.

The present process is more applicable than the two-step process if vat colors are included in the same pattern. When several colors are printed in the same pattern, a slight unavoidable intermixture of printing pastes occurs which may readily be understood from a study of the mechanical construction of a printing machine. If all of the colors are of the same general class, no serious difficulty is encountered beyond a slight change in shade, as printing pastes containing the same general class of colors may be mixed together in all proportions. When thickened diazo solutions and vat color printing pastes are mixed together, however, mutual decomposition of the printing pastes immediately takes place. In practice, it is often necessary to stop and clean a printing machine after running for only a short time when these two classes of colors are printed. A black, tarry deposit forms on the printing rolls and doctor blades of the machine due to the intermixture and subsequent decomposition of small quantities of thickened diazo solution and vat color printing paste.

Printing compositions of the present invention do not offer this difficulty, as they may be mixed with vat color printing pastes without the effects of decomposition as described above.

Selected examples of printing compositions of the present invention are noticeably more stable than thickened diazo solutions. If thickened diazo solutions are to be kept a few hours before printing, it is necessary to cool them several degrees below room temperature to retard decomposition. In many cases provision is also made for cooling the color boxes of the printing machines. The new printing compositions do not require these precautions to insure their stability.

(B) *Advantages over the nitrosamine process*

Selected examples of the present printing compositions are noticeably more stable at room temperatures than nitrosamine printing pastes, as they may be employed after standing for three or four days with good results. The nitrosamine printing pastes are decomposed to such an extent that very weak and dull prints are obtained.

By the nitrosamine process the insoluble azo pigment is usually developed by ageing the printed material and then passing through an acid bath. Economy of operation is obtained by the new process, as the azo pigment is produced within the ager. The treatment with an acid bath is, therefore, unnecessary.

After development of the azo color, the printed material is soaped to remove unfixed pigment, gums, etc. It is difficult to maintain a white ground by the nitrosamine process, as the unfixed pigment, which is removed by the soaping, discolors the ground or unprinted portions of the fabric. Clearer grounds are obtained by the new process as the azo pigment is more securely fixed on the fiber.

Very poor results are obtained by the nitrosamine on cellulose acetate and animal fibers. In some cases the fiber is noticeably tendered by the strongly alkaline nitrosamine printing paste. In other instances the azo pigment is only deposited on the surface of the fiber and is readily removed by soaping. By the new process very good fixation of the azo pigment is obtained on these fibers. Since the new printing compositions are not strongly alkaline, they may be successfully employed on the above fibers.

A wide range of colors is available by the new process. By the nitrosamine process, the range of colors is limited as only certain diazotized aromatic amines may be converted into the corresponding nitrosamine.

It is often desirable to print vat colors in the same pattern with azo colors, but the results are not satisfactory by the nitrosamine process. The printed material is aged in the vat color ager and then passed through the usual vat color oxidation bath containing sodium bichromate and acetic acid. The vat color oxidation bath serves to oxidize the vat color and, also, provides an acid medium for the development of the azo color. If several hundred yards of material are processed by this method, the azo color becomes progressively weaker and duller. This is due to the liberation of formaldehyde and reducing vapors in the ager which exert an injurious effect on the nitrosamine.

By the process of this invention, improved results are obtained as the insoluble azo pigment is produced within the ager. The azo pigment is only very slightly affected by the reducing vapors in the ager, whereas the nitrosamine is decomposed to a noticeable extent.

As many apparently widely different embodiments of this invention may be made without departing from the spirit and scope thereof, it is to be understood that I do not limit myself to the specific embodiments thereof except as defined in the following claims.

I claim:

1. A dye composition comprising a water-soluble diazoimino compound which is hydrolyzable to a diazo compound in acid solution, an ice color coupling component which will react with said diazo compound to form an insoluble azo dye, and a compound which forms an acid by hydrolysis on the application of heat in the presence of moisture but is not readily hydrolyzable at ordinary temperatures.

2. A dye composition comprising a water-soluble diazoimino compound which is hydrolyzable to a diazo compound in acid solution, an ice color coupling component which will react with said diazo compound to form an insoluble azo dye, an alkaline reacting substance, and a compound which forms an acid by hydrolysis on the application of heat in the presence of moisture but is not readily hydrolyzable at ordinary temperatures.

3. A dye composition comprising a water-soluble diazoimino compound which is hydrolyzable to a diazo compound in acid solution, an ice color coupling component which will react with said diazo compound to form an insoluble azo dye, a wetting agent, and a compound which forms an acid by hydrolysis on the application of heat in the presence of moisture but is not readily hydrolyzable at ordinary temperatures.

4. A dye composition comprising a water-soluble diazoimino compound, an arylamide of 2:3-hydroxy-naphthoic acid, and a compound which forms an acid by hydrolysis on the application of heat in the presence of moisture but is not readily hydrolyzable at ordinary temperatures.

5. A dye composition comprising a water-soluble diazoimino compound, an ice color coupling component and a compound which forms an acid by hydrolysis on the application of heat in the presence of moisture but is not readily hydrolyzable at ordinary temperatures, said acid-forming compound being selected from the alkali metal salts of halogen substituted organic acids.

6. A dye composition comprising a water-soluble diazoimino compound, an ice color coupling component and a compound which forms an acid by hydrolysis on the application of heat in the presence of moisture but is not readily hydrolyzable at ordinary temperatures, said acid-forming compound being a lower aliphatic carboxylic acid ester of a polyhydric alcohol.

7. A dye composition comprising a water-soluble diazoimino compound, an ice color coupling component and glycerol diacetate.

8. A dye composition comprising a water-soluble diazoimino compound, an ice color coupling component and a compound which forms an acid by hydrolysis on the application of heat in the presence of moisture but is not readily hydrolyzable at ordinary temperatures, said acid-forming compound being selected from salts of organic nitrogen bases having an association exponent from about 5.26 to about 11.31.

9. A dye composition comprising a water-soluble diazoimino compound, an ice color coupling component and piperidine hydrochloride.

10. A printing composition comprising a water-soluble diazoimino compound which is stable in alkaline solutions but hydrolyzable to a diazo compound in acid solutions, an ice color coupling component which will react with said diazo compound to form an insoluble dye, a small amount of an alkali metal hydroxide, a small amount of a wetting agent, a thickener, and sodium monochloroacetate.

11. A printing composition comprising a solution of approximately 7 parts of a mixture of equimolecular proportions of the compound having the formula

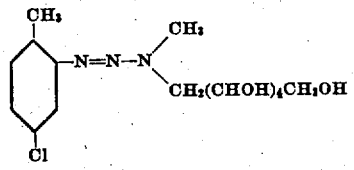

and the ortho-toluidide of 2:3-hydroxy-naphthoic acid, 7 parts of cellosolve, 12 parts of water and 3 parts of 30% sodium hydroxide solution mixed with about 50 parts of a thickener prepared from 100 parts of wheat starch, 540 parts of water and 360 parts of 6% gum tragacanth solution and 20 parts of sodium monochloroacetate.

12. The process of coloring textile materials which comprises applying thereto a stable dye composition containing a water-soluble diazoimino compound, an ice color coupling component and a compound which forms an acid by hydrolysis on the application of heat in the presence of moisture but is not readily hydrolyzable at ordinary temperatures, and applying heat in the presence of moisture to the treated material.

13. In a process of producing printed textile materials, the step which comprises printing on textiles with a printing paste containing a water-soluble diazoimino compound, an ice color coupling component and a compound which forms an acid by hydrolysis on the application of heat in the presence of moisture but is not readily hydrolyzable at ordinary temperatures.

14. In a process of producing printed textile materials, the step which comprises printing in the same pattern a printing paste containing a water-soluble diazoimino compound, an ice color coupling component and a compound which forms an acid by hydrolysis on the application of heat in the presence of moisture but is not readily hydrolyzable at ordinary temperatures, and a vat color printing paste containing a reducing agent.

15. In a process of producing printed textile materials, the step which comprises printing in the same pattern a printing paste containing a water-soluble diazoimino compound, an ice color coupling component and a compound which forms an acid by hydrolysis on the application of heat in the presence of moisture, but is not readily hydrolyzable at ordinary temperatures, and a vat color printing paste containing sodium formaldehyde sulfoxylate as a reducing agent.

16. In a process of preparing printed textile materials, the step which comprises printing in the same pattern an azo dye printing paste containing a water-soluble diazoimino body, an ice color coupling component and a potential acidic substance, and a vat color printing paste, drying the printed fabric, and aging the printed material with steam.

17. A dye composition comprising a water-soluble diazoimino compound, an ice color coupling component and a potential acidic substance of the class consisting of salts of strong inorganic bases with strong organic acids.

18. A dye composition comprising a water-soluble diazoimino compound, an ice color coupling component and a potential acidic substance of the class consisting of alkali metal salts of alpha-chloro lower fatty acids.

19. In a process of producing printed textile materials, the step which comprises printing on textiles with a printing paste containing a water-soluble diazoimino compound, an ice color coupling component and an alkali metal chloroacetate, drying the printed fabric, and aging with steam.

20. In a process of producing printed, regenerated cellulose materials, the step which comprises printing on a material containing regenerated cellulose with a printing paste containing a water-soluble diazoimino compound, an ice color coupling component and a potential acidic substance, drying the printed fabric, and aging with steam.

21. In a process of preparing printed, regenerated cellulose materials, the step which comprises printing in the same pattern an azo dye printing paste containing a water-soluble diazoimino body, an ice color coupling component and a potential acidic substance, and a vat color printing paste, drying the printed fabric, and aging the printed material with steam.

IVAN F. CHAMBERS.

Certificate of Correction

Patent No. 2,088,506.  July 27, 1937.

IVAN F. CHAMBERS

It is hereby certified that errors appear in the printed specification of the above numbered patent requiring correction as follows: Page 8, first column, lines 40 to 48, inclusive, the formula should appear as shown below instead of as shown in the patent:

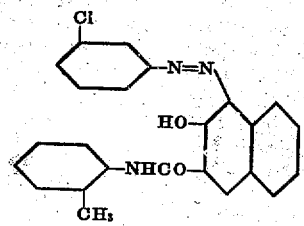

and second column, line 8, for "15 parts of ST thickener" read *25 parts of ST thickener*; page 9, first column, line 63, for "140" read *140°*; and that the said Letters Patent should be read with these corrections therein that the same may conform to the record of the case in the Patent Office.

Signed and sealed this 26th day of October, A. D. 1937.

[SEAL]

HENRY VAN ARSDALE,
*Acting Commissioner of Patents.* nary temperatures, and applying heat in the presence of moisture to the treated material.

13. In a process of producing printed textile materials, the step which comprises printing on textiles with a printing paste containing a water-soluble diazoimino compound, an ice color coupling component and a compound which forms an acid by hydrolysis on the application of heat in the presence of moisture but is not readily hydrolyzable at ordinary temperatures.

14. In a process of producing printed textile materials, the step which comprises printing in the same pattern a printing paste containing a water-soluble diazoimino compound, an ice color coupling component and a compound which forms an acid by hydrolysis on the application of heat in the presence of moisture but is not readily hydrolyzable at ordinary temperatures, and a vat color printing paste containing a reducing agent.

15. In a process of producing printed textile materials, the step which comprises printing in the same pattern a printing paste containing a water-soluble diazoimino compound, an ice color coupling component and a compound which forms an acid by hydrolysis on the application of heat in the presence of moisture, but is not readily hydrolyzable at ordinary temperatures, and a vat color printing paste containing sodium formaldehyde sulfoxylate as a reducing agent.

16. In a process of preparing printed textile materials, the step which comprises printing in the same pattern an azo dye printing paste containing a water-soluble diazoimino body, an ice color coupling component and a potential acidic substance, and a vat color printing paste, drying the printed fabric, and aging the printed material with steam.

17. A dye composition comprising a water-soluble diazoimino compound, an ice color coupling component and a potential acidic substance of the class consisting of salts of strong inorganic bases with strong organic acids.

18. A dye composition comprising a water-soluble diazoimino compound, an ice color coupling component and a potential acidic substance of the class consisting of alkali metal salts of alpha-chloro lower fatty acids.

19. In a process of producing printed textile materials, the step which comprises printing on textiles with a printing paste containing a water-soluble diazoimino compound, an ice color coupling component and an alkali metal chloroacetate, drying the printed fabric, and aging with steam.

20. In a process of producing printed, regenerated cellulose materials, the step which comprises printing on a material containing regenerated cellulose with a printing paste containing a water-soluble diazoimino compound, an ice color coupling component and a potential acidic substance, drying the printed fabric, and aging with steam.

21. In a process of preparing printed, regenerated cellulose materials, the step which comprises printing in the same pattern an azo dye printing paste containing a water-soluble diazoimino body, an ice color coupling component and a potential acidic substance, and a vat color printing paste, drying the printed fabric, and aging the printed material with steam.

IVAN F. CHAMBERS.

Certificate of Correction

Patent No. 2,088,506.  July 27, 1937.

IVAN F. CHAMBERS

It is hereby certified that errors appear in the printed specification of the above numbered patent requiring correction as follows: Page 8, first column, lines 40 to 48, inclusive, the formula should appear as shown below instead of as shown in the patent:

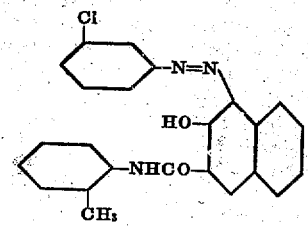

and second column, line 8, for "15 parts of ST thickener" read *25 parts of ST thickener*; page 9, first column, line 63, for "140" read *140°*; and that the said Letters Patent should be read with these corrections therein that the same may conform to the record of the case in the Patent Office.

Signed and sealed this 26th day of October, A. D. 1937.

[SEAL]

HENRY VAN ARSDALE,
*Acting Commissioner of Patents.*

Certificate of Correction

Patent No. 2,088,506. July 27, 1937.

IVAN F. CHAMBERS

It is hereby certified that errors appear in the printed specification of the above numbered patent requiring correction as follows: Page 8, first column, lines 40 to 48, inclusive, the formula should appear as shown below instead of as shown in the patent:

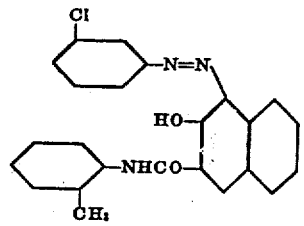

and second column, line 8, for "15 parts of ST thickener" read *25 parts of ST thickener*; page 9, first column, line 63, for "140" read *140°*; and that the said Letters Patent should be read with these corrections therein that the same may conform to the record of the case in the Patent Office.

Signed and sealed this 26th day of October, A. D. 1937.

[SEAL]

HENRY VAN ARSDALE,
*Acting Commissioner of Patents.*